US012785408B2

(12) United States Patent
Sortomme et al.

(10) Patent No.: US 12,785,408 B2
(45) Date of Patent: Nov. 3, 2026

(54) METHOD AND SYSTEM FOR MANAGING AN ELECTRICAL GRID

(71) Applicant: AspenTech Corporation, Bedford, MA (US)

(72) Inventors: Eric Sortomme, Plymouth, MN (US); Thomas Niedzielski, Plymouth, MN (US); Lingesh Raghavan, Plymouth, MN (US); John Duff, Breezy Point, MN (US); Travis Ramacher, Richmond, MN (US)

(73) Assignee: AspenTech Corporation, Bedford, MA (US)

( * ) Notice: Subject to any disclaimer, the term of this patent is extended or adjusted under 35 U.S.C. 154(b) by 375 days.

(21) Appl. No.: 18/526,613

(22) Filed: Dec. 1, 2023

(65) Prior Publication Data

US 2024/0186797 A1 Jun. 6, 2024

Related U.S. Application Data

(60) Provisional application No. 63/385,805, filed on Dec. 2, 2022.

(51) Int. Cl.
*H02J 3/46* (2026.01)

(52) U.S. Cl.
CPC .................................... *H02J 3/46* (2013.01)

(58) Field of Classification Search
CPC ...... H02J 3/46; H02J 2101/40; H02J 2103/35; H02J 2105/10; H02J 3/48; H02J 3/14
See application file for complete search history.

(56) References Cited

U.S. PATENT DOCUMENTS

| | | | | |
|---|---|---|---|---|
| 11,056,912 | B1 | 7/2021 | Wells et al. | |
| 2012/0078430 | A1* | 3/2012 | Fan | G06F 1/329 700/295 |
| 2013/0326064 | A1* | 12/2013 | Gulati | H04L 47/805 709/226 |
| 2014/0214227 | A1 | 7/2014 | Thornton et al. | |
| 2014/0249688 | A1* | 9/2014 | Ansari | H02J 13/13 700/297 |
| 2016/0028235 | A1* | 1/2016 | Sun | G05F 1/10 |
| 2018/0138711 | A1* | 5/2018 | Dall'Anese | H02J 3/381 |

(Continued)

FOREIGN PATENT DOCUMENTS

| | | | | |
|---|---|---|---|---|
| WO | WO-2023030705 A1 * | 3/2023 | H02J 3/466 |
| WO | 2024/119105 A1 | 6/2024 | |

OTHER PUBLICATIONS

International Search Report and Written Opinion received for PCT Patent Application No. PCT/US2023/082128, mailed on Apr. 4, 2024, 16 pages.

(Continued)

*Primary Examiner* — Santosh R Poudel
(74) *Attorney, Agent, or Firm* — Hamilton, Brook, Smith & Reynolds, P.C.

(57) ABSTRACT

Embodiments manage an electrical grid. One such embodiment, at a node in an electrical grid topology including a plurality of nodes, identifies a power output deviation from a target. Responsive to identifying the power output deviation, nodes below a control node in the electrical grid topology are traversed and power output at each traversed node is adjusted until at least one terminal node is reached.

16 Claims, 5 Drawing Sheets

(56) References Cited

U.S. PATENT DOCUMENTS

| | | | | |
|---|---|---|---|---|
| 2021/0273483 | A1 | 9/2021 | Ding et al. | |
| 2023/0361565 | A1* | 11/2023 | Wang | G06Q 10/06315 |

OTHER PUBLICATIONS

Zheng, H., et al., "A Grid-Edge-Inspired and Community-Oriented Control Framework: Utility perspective on centralized and decentralized control", IEEE Electrification Magazine, vol. 10, No. 4, Dec. 1, 2022, pp. 66-76.

"Distributed Energy Resource Management Systems," OSI an AspenTech Business, retrieved from https://www.osii.com/solutions/products/derms.asp, retrieved on Oct. 30, 2023, pp. 2.

Kaleem Ullah, et al., Automatic Generation Control in Modern Power Systems with Wind Power and Electric Vehicles. Energies 2022, 15, 1771. https://doi.org/10.3390/en15051771, Feb. 27, 2022, pp. 1-24.

Kaleem Ullah, et al., Automatic Generation Control Strategies in Conventional and Modern Power Systems: A Comprehensive Overview. Energies 2021, 14, 2376. https://doi.org/10.3390/en14092376, Apr. 22, 2021, pp. 1-44.

* cited by examiner

METHOD AND SYSTEM FOR MANAGING AN ELECTRICAL GRID

RELATED APPLICATION

This application claims the benefit of U.S. Provisional Application No. 63/385,805, filed on Dec. 2, 2022. The entire teachings of the above application are incorporated herein by reference.

BACKGROUND

"DERs" (distributed energy resources) is a general term referring to a variety of small-scale electricity generation and storage devices. These sources can include a variety of energy types such as solar, wind, and battery storage, among others. Typically, the devices (i.e., DERs) can adjust their generation power and/or demand up or down, on command, to meet a utility's needs, e.g., generation needs, on the grid.

SUMMARY

Embodiments of the present invention allow a much more efficient method to control devices, e.g., DERs, in an electrical grid than heretofore achieved. Specifically, an embodiment provides a RRDS (recursive regulation dispatch system) that allows a DERMS (DER management system) to respond to simultaneous violations of electrical grid integrity constraints at multiple points throughout the grid, such as at feeder and substation levels, among other examples, using a single system, e.g., controller. Embodiments include a computer-implemented method and computer-based system that recursively dispatch DERs to correct electrical grid integrity violations. Further, embodiments can apply different relative priorities to different levels of the electrical grid.

An example embodiment is directed to a computer-implemented method for managing an electrical grid. To begin, at a node in an electrical grid topology including a plurality of nodes, the method identifies a power output deviation from a target. Responsive to identifying the power output deviation, the method traverses nodes below a control node in the electrical grid topology and adjusts power output at each traversed node until a terminal node is reached. In an embodiment, the method further includes performing the traversing and the adjusting until all terminal nodes are reached. According to another embodiment, the power output deviation from the target includes a power output violation and/or a deviation from a user-specified value.

In an embodiment, the method further includes, before identifying the power output deviation, identifying the control node in the electrical grid topology. According to one such embodiment, identifying the control node in the electrical grid topology includes traversing nodes above a first terminal node, i.e., a given terminal node, in the electrical grid topology until a first node, i.e., a given node, meeting a criterion is reached and identifying the first node meeting the criterion as the control node. In another embodiment, the method may further include traversing nodes above a resource in the electrical grid topology, determining that a given node is active in regulation and meets at least one additional criterion, and identifying the given node as the control node. According to yet another embodiment, the method may further include configuring the control node to control one or more previously traversed nodes and/or resources.

According to another embodiment, the criterion (for identifying the control node) includes the first node being a first regulation point and the first node being in a first power output deviation and an ancestor node, e.g., an immediate parent, an intermediate parent, or an ultimate parent, of the first node being a second regulation point and the ancestor node not being in a second power output deviation. In yet another embodiment, the criterion includes (i) the first node being a first regulation point and the first node being in a first power output deviation and an ancestor node of the first node being a second regulation point and the ancestor node being in a second power output deviation or (ii) the first node not being in the first power output deviation and the ancestor node not being in the second power output deviation, and a first user-defined priority of the first node being greater than a second user-defined priority of the ancestor node. According to yet another embodiment, the criterion includes the first node having at least one resource belonging to a user-defined group (UDG), an ancestor node of the first node being a regulation point, and: (i) the UDG being in a first power output deviation and the ancestor node not being in a second power output deviation, (ii) a first user-defined priority of the UDG being greater than a second user-defined priority of the ancestor node, and/or (iii) the UDG having an active status and the ancestor node having an inactive status. In an embodiment, a UDG may be evaluated or considered at a lower level of the electrical grid topology; for example, a UDG may be an initial node to examine as a potential control node. According to another embodiment, the criterion includes the first node being a first regulation point and the first node having an active status and an ancestor node of the first node being a second regulation point and the ancestor node having an inactive status. Further, in yet another embodiment, the node (i.e., the node at which the power output deviation is identified) is the control node. According to an embodiment, having an active status, e.g., a status specified by a user to indicate that a node will participate in regulation, may be a requirement for a node to participate in regulation. It is noted that, in another embodiment, if no node meeting a criterion is identified—for example, if no node is responding to a grid violation or attempting to reach a user-specified target value—then a nearest (i.e., most directly connected to a starting DER in the topology) active node with a resource connected to that node may be selected as the control node.

In an embodiment, adjusting power output includes, at a given traversed node, adjusting power output based on a resource of at least one node below the given traversed node in the electrical grid topology. It is noted that, according to another embodiment, in addition to terminal nodes, other nodes in the electrical grid topology may have a connected or attached resource. Further, in yet another embodiment, adjusting power output based on the resource includes adjusting power output based on at least one of a power output increase margin of the resource and a power output decrease margin of the resource.

Another example embodiment is directed to a computer-based system for managing an electrical grid. The system includes a processor and a memory with computer code instructions stored or held thereon. In such an embodiment, the processor and the memory, with the computer code instructions, are configured to cause the system to implement any embodiments, or combination of embodiments, described herein.

Yet another example embodiment is directed to a non-transitory computer program product for managing an electrical grid. The computer program product includes a computer-readable medium with computer code instructions stored thereon. The computer code instructions are configured, when executed by a processor, to cause an apparatus associated with the processor to implement any embodiments, or combination of embodiments, described herein. As understood by one skilled in the art, one or more processors may execute the computer code instructions to cause the apparatus to implement an embodiment.

It is noted that embodiments of the method, system, and computer program product may be configured to implement any embodiments, or combination of embodiments, described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
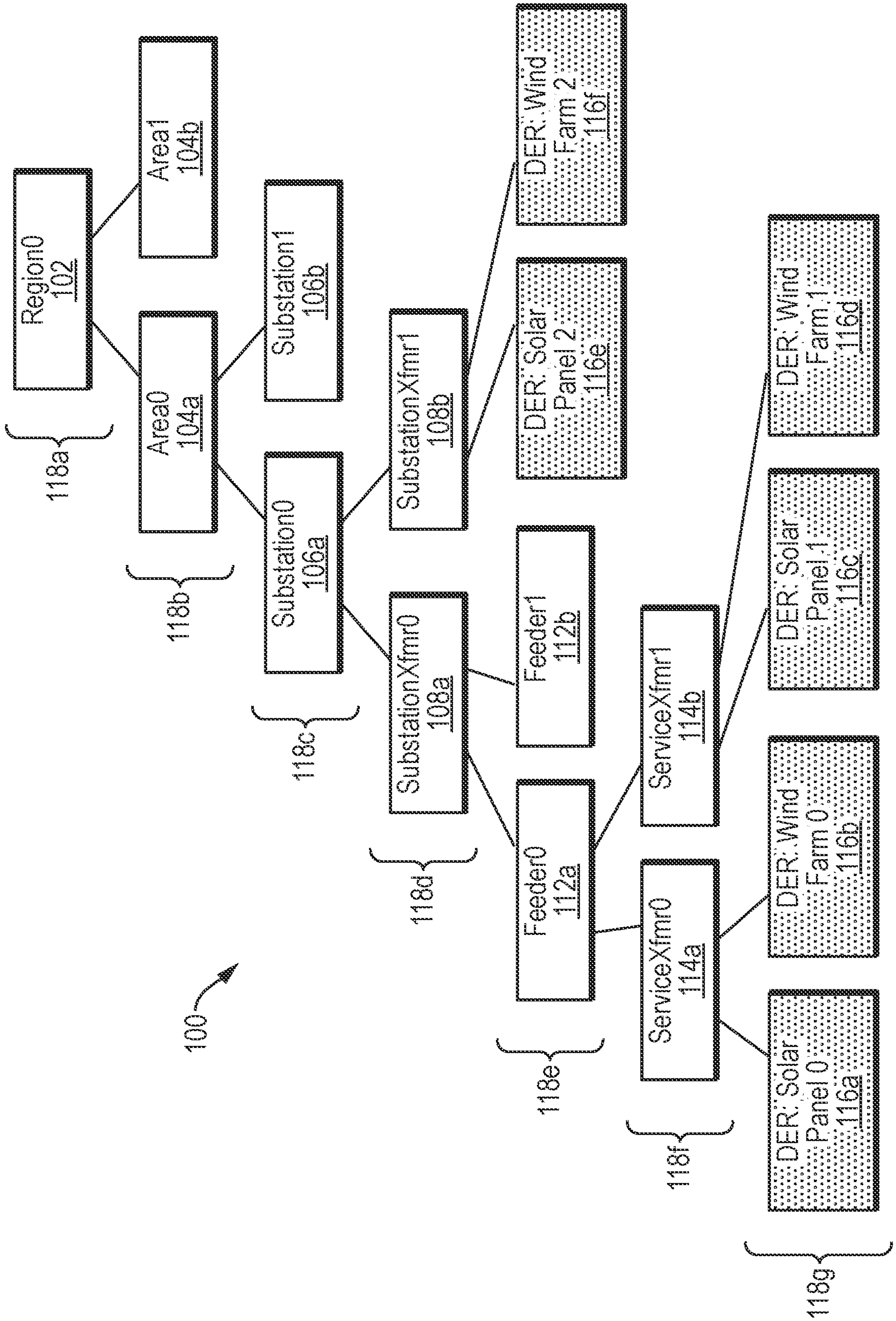
FIG. 1 is a schematic view of an electrical grid topology for which embodiments address power output deviations, e.g., violations and imbalances.

As noted herein, embodiments provide functionality to manage electrical grids. FIG. 1 is an example of an electrical grid topology 100. Topology 100 includes region 102 (which is representative of a geographic region, e.g., county) at level 118*a*. Below region 102 are areas 104*a-b* (which are representative of a geographic areas smaller than region 102, e.g., towns or neighborhoods) at level 118*b*. In turn, below area 104*a* are substations 106*a-b* at level 118*c*. Further, below substation 106*a* are substation transformers (XFMRs) 108*a-b* at level 118*d*. Below substation XFMR 108*a* are feeders 112*a-b*. In turn, below feeder 112*a* are service XFMRs 114*a-b* at level 118*f*. Further, below service XFMR 114*a* are DERs 116*a-b* (e.g., solar panel 116*a* and wind farm 116*b*). Similarly, below service XFMR 114*b* are DERs 116*c-d* (e.g., solar panel 116*c* and wind farm 116*d*). In contrast to substation XFMR 108*a*, substation XFMR 108*b* has directly below it DERs 116*e-f* (e.g., solar panel 116*e* and wind farm 116*f*). DERs 116*a-d* are at level 118*g*, however, DERs 116*e-f* are at the same level 118*e* as feeders 112*a-b*. In an embodiment, data and/or parameters for an electrical grid topology, e.g., 100, may be stored in a GIS (geographic information system) or other suitable system or database known to those of skill in the art.

Continuing with FIG. 1, as stated above, topology 100 includes DERs 116*a-f*. "DERs" is a general term referring to a variety of small-scale electricity generation and storage devices. These electricity or power sources may provide a variety of energy types such as solar, wind, and battery storage, among others. DERs, e.g., 116*a-f*, are devices that can adjust their generation power up or down, on command, to meet a utility's generation needs on a grid, e.g., topology 100. There are multiple levels, e.g., 118*a-g*, on the grid (its topology), in which DER devices, e.g., 116*a-f*, can be attached at any of these different levels, e.g., 118*e* or 118*g*. In FIG. 1, each level 118*a-g* is drawn or represented by a row for purposes of illustration and not limitation.

Referring again to FIG. 1, a nonlimiting example of a problem addressed and solved by embodiments is when there is a power imbalance on a grid, e.g., topology 100, at a node, e.g., substation 106*a*, due to too much power being generated under substation 106*a*. A scenario such as this can overheat transformers, causing outages and thousands to millions of dollars of damage. To alleviate this problem, a utility needs DERs, e.g., 116*a-f*, at different topology levels (rows), e.g., 118*e* and 118*g*, under substation 106*a* to reduce their total power output by a calculated amount in real-time. Embodiments can provide such functionality and automatically control the DERs 116*a-f* to reduce their power output. In one such embodiment, such functionality is implemented by executing a method described herein, e.g., the method 300 described hereinbelow in relation to FIG. 3.

Continuing still with FIG. 1, a further nonlimiting example of a problem addressed and solved by embodiments may relate to a home solar system, e.g., solar system 116*a*. The home solar system 116*a* may be connected to a local electrical grid via a stepdown or service transformer, e.g., local service transformer 114*a*. In turn, the local service transformer 114*a* may be connected via a substation circuit (formed by feeder 112*a* and substation transformer 108*a*) to a local substation, e.g., substation 106*a*. Ultimately, the local substation 106*a* may be part of a region of a utility's electrical network, e.g., region 102 of electrical network 100. To continue, operators can attach "regulation points" to any topological node, e.g., service XFMR(s) 114*a-b*, substation(s) 106*a-b*, and/or region 102, in a network, e.g., 100. A regulation point, i.e., regpoint, may be a logical construct or other suitable module or component that designates an objective for a regulated subnet to accomplish. Nonlimiting examples of objectives for a regpoint include threshold(s) or limit(s) for a particular variable or a specified target value for a particular variable. Moreover, different types of variables may be used. As a nonlimiting example, a given variable may indicate net load. For instance, net load for a local service transformer, such as 114*a*, may be defined as the difference between a load that customers, e.g., solar system 116*a* and wind farm 116*b*, are drawing from a grid, e.g., 100, and power generated by the customer systems 116*a-b*. Staying with the present example, limits for net load for the local service transformer 114*a* may be −10 kW and 10 kW; other limit values are also suitable. If, for instance, the solar system 116*a*, alone, or together with the wind farm 116*b*, is producing greater than 10 kW—i.e., exceeding the 10 kW threshold-then embodiments may cause service transformer 114*a* to curtail generation at the solar system 116*a* and/or wind farm 116*b*. Continuing with the present example and moving to higher levels in grid 100, at the local substation 106*a*, limits for net load may be specified as −100 kW and 100 kW; other limit values are also suitable. In one instance, the local substation 106*a* may be operating normally, i.e., its net load may be within the example −100 kW and 100 kW limits. In another instance, due to, e.g., "backfeeding" from substation 106*a*'s subnetwork, the substation 106*a*'s net load may be −105 kW, i.e., beyond the example −100 kW limit. When such a circumstance arises, embodiments may identify resource(s) in substation 106*a*'s network, e.g., solar system 116*a*, and cause the solar system 116*a* to curtail generation, thereby returning substation 106*a*'s net load to within the −100 kW limit. In yet another instance, substation 106*a*'s net load may again go beyond the −100 kW limit, with a value of −150 kW. When such a circumstance arises, embodiments may identify resource(s) in substation 106a's network, e.g., all solar systems 116a, 116c, and 116e, as well as other resources such as a battery (not shown) that can charge/discharge between −50 kW and 50 kW. In turn, embodiments may use the battery to absorb the excess generation by charging. Staying with the current example, if the battery approaches the limit of its charge capacity, then embodiments may also cause the solar systems 116a, 116c, and 116e to provide a combined curtailment of, e.g., 10 kW. As seen in the above nonlimiting example, "control error"-which may be defined as going beyond a threshold or limit value, thereby creating a need for regulation—may occur at different individual levels, e.g., 118e and 118g, of an electrical grid, e.g., grid 100.

Another nonlimiting example of a problem addressed and solved by embodiments may implicate multiple different levels of an electrical grid. For instance, an example customer grid may have four levels. In the example customer grid, there may be two sets of solar and storage at a single point of interconnection. Further, a lowest constraint may be a transformer interconnect with batteries. If, for instance, the solar is at maximum production and the batteries are at maximum discharge, this may overload the transformer. Embodiments, e.g., method 330, can be employed to avoid transformer overloading.

Yet another nonlimiting example of a problem addressed and solved by embodiments may also implicate multiple different levels of an electrical grid. For instance, an example customer grid may have a constraint that—at one level-a battery can only charge from solar production. At a next level, embodiments may need to analyze solar production and/or weather conditions. Further, each substation in the example customer grid may have a different locational marginal price. If, for instance, a given price becomes high enough, it may be undesirable to charge a battery even if solar systems are producing. Another constraint in the example customer grid may be that the grid's own load must be met with its own generation. The grid may also increase battery charging to consume excess generation. As mentioned in the present example, the customer grid may include four separate levels, for instance, a DER point of interconnection level, a substation level, an area level, and a region level—each with different priorities-being addressed simultaneously by embodiments. To give a nonlimiting example of different priorities, a first priority may relate to point(s) of interconnection. Specifying a point of interconnection as the highest priority may, for instance, avoid a risk of overcharging batteries. A second example priority may relate to ensuring that ACE (area control error) within a region remains within defined thresholds. Further, a third example priority may relate to pricing. A fourth and lowest example priority may relate to "greedy charging" methodologies. Thus, for instance, if the customer grid is experiencing three different types of violations-relating to, e.g., a point of interconnect, greedy charging, and an ACE event-embodiments may first address the point of interconnect violation, because that type is assigned the highest priority. It is also noted that information, such as violation information, among other examples, concerning an electrical grid, e.g., grid 100, may be obtained using a SCADA (supervisory control and data acquisition) system or other suitable system known to those of skill in the art.

Referring yet again to FIG. 1, before the present disclosure, existing tools, such as Integra™ DERMS (Aspen Technology, Inc., Bedford, MA), were only able to control DERs, e.g., 116a-f, at each of the levels (rows), e.g., 118e and 118g, separately. This meant an operator had to set separate threshold values at, e.g., substation XFMR 108b, service XFMR 114a, and service XFMR 114b, to separately control devices under each of them, e.g., DERs 116e-f, 116a-b, and 116c-d, respectively. So, for instance, substation XFMR 108b would control, e.g., solar panel 116e and wind farm 116f, service XFMR 114a would control, e.g., solar panel 116a and wind farm 116b, and service XFMR 114b would control, e.g., solar panel 116c and wind farm 116d—all separately from each other. For the abovementioned nonlimiting example where the utility needs all the DER devices, e.g., 116a-f, to reduce power output, the operator would have to figure out how much each set (e.g., set of DERs 116e-f associated with substation XFMR 108b, set of DERs 116a-b associated with service XFMR 114a, and set of DERs 116c-d associated with service XFMR 114b) needs to reduce power output, and separately manage each set. This process is a manual operation that is resource intensive and can be error prone. Each level (row), e.g., 118a-g, could also have its own priority, and that could interfere with coming to a proper overall solution.

With yet further reference to FIG. 1, embodiments of the present disclosure provide, among other things, a much more efficient method to control DER devices, e.g., 116a-f. Using embodiments, an operator can provide instructions regarding power output for any node in the grid 100, e.g., substation 106a, and an embodiment can automatically control node(s) and/or resource(s) under the node to comply with the operator provided instructions. Further, an embodiment (as a nonlimiting example, a next generation Integra™ DERMS tool improved by principles of the present disclosure) may recursively traverse down, e.g., topology 118d-g under substation 106a, and automatically delegate/allocate separate power reductions to, e.g., substation XFMR 108b, service XFMR 114a, and service XFMR 114b. The embodiment in turn may cause each of those topology nodes to reduce power generation of the DERs under them, e.g., 116c-f, 116a-b, and 116c-d, respectively. A total reduction may be equal to what reduction is necessary in view of operator provided operational guidelines for substation 106a. The embodiment may cause each level, e.g., 118d, to delegate calculated reduction amounts to a level beneath it, e.g., 118e, until the embodiment gets to the actual DER devices, e.g., 116a-f, at which point a reduction amount needed for a given level, e.g., 118d, may be allocated/distributed among the DER devices directly under that level, e.g., 116e-f.

To continue still with FIG. 1, power generation from DERs, e.g., 116a-f, inherently fluctuates due to clouds, wind speed changes, etc., causing further challenges in controlling overall power balance. An embodiment with principles of the present disclosure can monitor a power output of elements (e.g., DERs 116a-f, substation XFMRs 108a-b, service XFMRs 114a-b, feeders 112a-b, etc.) under, e.g., substation 106a, and adjust allocations as necessary in real-time. To give another nonlimiting example, in a case where, e.g., solar panel 116a and wind farm 116b under service XFMR 114a, have their power output reduced below a needed threshold (because of, e.g., clouds or wind speed changes), the embodiment may adjust other DERs under a different level, e.g., DERs 116e-f at level 118e, to have their power output increased to make up for the reduction under service XFMR 114a. (In this nonlimiting example, the DERs 116e-f are presently curtailed and some of that curtailment can be released by the embodiment; however, if, for instance, the DERs 116e-f are not curtailed, then, as an alternative, the embodiment can discharge one or more battery(ies) (not shown).) Overall power thresholds can be specified at a high level in a grid, e.g., substation 106*a* of topology 100. Then, when the thresholds are crossed, and DER devices, e.g., 116*a-f*, are required to reduce or increase power output, necessary adjustments to the individual devices, e.g., 116*a-f*, under that point (level), e.g., substation 106*a* at level 118*c*, in the grid (but potentially at different descending levels in the grid), may be automatically allocated level-by-level down to the actual devices (DERs), e.g., 116*a-f*. Embodiments may continually monitor DER devices (e.g., 116*a-f*)—that is, their power outputs—and adjust them (i.e., their power outputs) up and down as necessary to achieve an overall objective.

Whenever a grid condition that caused an original threshold violation at a high level is ended, embodiments may automatically return devices, e.g., DERs 116*a-f* (FIG. 1), to their normal power output levels. This may again be performed in a recursive manner, but this time in an opposite direction—i.e., ascending levels of a grid topology, e.g., levels 118*a-g* of topology 100 (FIG. 1). As each lower level returns all of its DERs, e.g., DERs 116*e-f* at level 118*e*, to their normal power output, the grid network may be returned to normal overall.

In summary, embodiments provide, e.g., a computer-based system and computer-implemented method, for which:

a) There exists an electrical grid with multiple levels in its topology, e.g., topology 100 with levels 118*a-g* (FIG. 1), and one or more power generation DER devices, e.g., 116*a-f* (FIG. 1), that could be attached at any of those levels.

b) Threshold values (high and low power limits) can be assigned to any level, e.g., 118*a-g*, of the grid.

c) If a threshold value is crossed at any level, e.g., 118*c*, then a total power increase or decrease needed (depending on if a high or low limit was crossed) may be recursively distributed and divided up between every level, e.g., 118*d-g*, beneath the point where the threshold value was crossed. Each level, e.g., 118*d*, may then divide up its amount to the levels directly underneath it, e.g., 118*e-g*, until embodiments get to a level that has actual DER devices, e.g., level 118*e* with DERs 116*e-f*, at which point a power increase/decrease necessary for that level may be divided among those DER devices, e.g., 116*e-f*.

d) Embodiments may continually monitor all levels, e.g., 118*a-g*, and DER devices, e.g., 116*a-f*, and as a load on the grid, e.g., topology 100, naturally changes over time, the total amount of required increase or decrease from the DER devices can go up and down. Embodiments may monitor such requirements (increased/decreased amounts) and automatically distribute down the levels, e.g., 118*a-g*, to the DER devices, e.g., 116*a-f*.

e) Embodiments may continually monitor all levels, e.g., 118*a-g*, and DER devices, e.g., 116*a-f*, and if some devices, e.g., 116*a-b*, are reducing or increasing their power output too much, then other devices at other levels, e.g., DERs 116*e-f* at level 118*e*, can be allocated new values to make up a difference. This may be done automatically by embodiments.

f) As grid conditions return to normal, embodiments may automatically and recursively return DER devices, e.g., 116*a-f*, to their normal power output, from the grid level, e.g., 118*g*, bottom-up, so that eventually a top-level threshold, e.g., a threshold for substation 106*a* at level 118*c* (FIG. 1), is no longer in violation.

To manage DERs, e.g., 116*a-f* (FIG. 1), that are connected to network devices, a DERMS of embodiments may create and manipulate regpoints, e.g., devices that can be regulated. In an embodiment, a regpoint is represented in memory as part of a topology, e.g., in the form of a graph. In such a graph, regpoints may be logical constructs that represent regulated devices. Further, "regpoint" may be a property of a node in the graph. For instance, a solar panel, e.g., 116*a*, 116*c*, or 116*e*, may be represented in a graph by a node and that node may have a regpoint property, indicating that the solar panel can be regulated.

While dispatching regpoints directly may be sufficient to handle single or unrelated violations, such a strategy is unsound for multiple related violations, especially if one device in violation is an ancestor of another. A RRDS, according to an embodiment, may employ recursive regulation assignment to optimally correct simultaneous violations at multiple levels of a grid hierarchy, e.g., levels 118*a-g* of topology 100 (FIG. 1). This may be done automatically with no operator intervention, although operators can prioritize regpoints to prepare for anticipated network situations.

While AGC (automatic generation control) is a well-established tool in power systems control, ADC (automatic DER control) extends AGC to DERs, and a RRDS implementing an embodiment can advantageously extend it further by providing a reliable, e.g., computer-based system, for conflict resolution when competing violations occur at multiple levels of a grid, e.g., levels 118*a-g* of topology 100 (FIG. 1). Embodiments and principles of the present disclosure also provide improved performance over existing approaches, such as cascade control, by not only solving (e.g., fully addressing violations or minimizing violations as much as possible) faster with a single system, e.g., controller, but converging to a steady state faster by recursively aggregating information from lower grid topology levels to higher ones to inform a decision process. Moreover, embodiments can apply different relative priorities to different levels of the grid. Further details and a nonlimiting working example embodiment are presented next.

In an example illustrative embodiment, first, a RRDS, e.g., computer-based system implementing the embodiment, may identify each DER, e.g., 116*a-f* (FIG. 1), that will participate in regulation. Next, a nearest regpoint and a controlling active regpoint may be found. The nearest regpoint and controlling active regpoint may be identified by climbing a network hierarchy, e.g., topology 100 with levels 118*a-g* (FIG. 1), starting from a DER, e.g., 116*a-f*, and testing any regpoints attached to network devices found on the way to the top level of the grid topology, e.g., level 118*a* of topology 100. The first regpoint found may be both a nearest regpoint (most directly connected to the starting DER, e.g., the nearest node to node 116*c* is the directly connect node 114*b* and the nearest node to 116*e* is the directly connected node 108*b*) and a first controlling regpoint. As such an embodiment ascends the hierarchy, it may compare any other regpoints it finds in a "contest" that is decided based on the following nonlimiting example criteria:

a) If a current regpoint is in a power output deviation and a new one is not, control remains with the current regpoint.

b) If the new regpoint is in a power output deviation and the current one is not, control moves to the new regpoint.

c) If neither or both regpoints are in a power output deviation, but one has a higher user-defined priority, control moves to that regpoint.

d) If the priorities are equal, but the current regpoint is for a DER belonging to group that is a user-defined group (UDG)—rather than a group defined by a base topology-then the UDG's properties are substituted for those of the current regpoint, and illustrative criteria a)-c) above are reevaluated based on the UDG's properties. In an embodiment, a group of DERs defined by a base topology may include all DERs for which a given topological node is their ancestor. For instance, according to another embodiment, the DERs 116*a-d* are in a topological group of the feeder 112*a* (FIG. 1), as well as topological groups of each of the feeder 112*a*'s ancestor nodes (i.e., the substation XFMR 108*a*, substation 106*a*, area 104*a*, and region 102 (FIG. 1)). Meanwhile, in yet another embodiment, the DERs 116*e-f* are not in the topological groups of the feeder 112*a* and substation XFMR 108*a*, but are in the topological groups of the substation XFMR 108*b*, substation 106*a*, area 104*a*, and region 102. By contrast, according to an embodiment, a UDG may contain DERs regardless of their position in the topology. For instance, according to another embodiment, a UDG may be created to contain all solar resources on the grid, e.g., the DERs 116*a*, 116*c*, and 116*e*. In yet another embodiment, a regpoint in this UDG would control all three of the DERs 116*a*, 116*c*, and 116*e* regardless of their locations throughout the grid 100.

What may make a RRDS (and other embodiments of the present disclosure) a recursive system is this rule: A regpoint may be controlled by a higher-level (in a grid topology, e.g., topology 100 of FIG. 1) regpoint if and only if all the former regpoint's DERs, e.g., 116*a-f* (FIG. 1), are controlled by the latter regpoint. Therefore, when regulation is dispatched, it can be dispatched recursively, descending through controlled regulation points until it ultimately reaches the DERs, e.g., 116*a-f*. This has a twofold advantage over direct dispatch: (1) because control error propagates down from a device in violation to a device nearest to DERs, e.g., service XFMRs 114*a-b* (FIG. 1) nearest to DERs 116*a-d* or substation XFMR 108*b* (FIG. 1) nearest to DERs 116*e-f*, ultimate control of the DERs, e.g., 116*a-f*, may remain as localized as possible while problems may be solved at any level of a hierarchy, e.g., level(s) 118*a-g* (FIG. 1) of topology 100, and (2) as violations are resolved and new violations occur, the regpoint selection process above may allow a chain of command to reform automatically.

Figure 2:
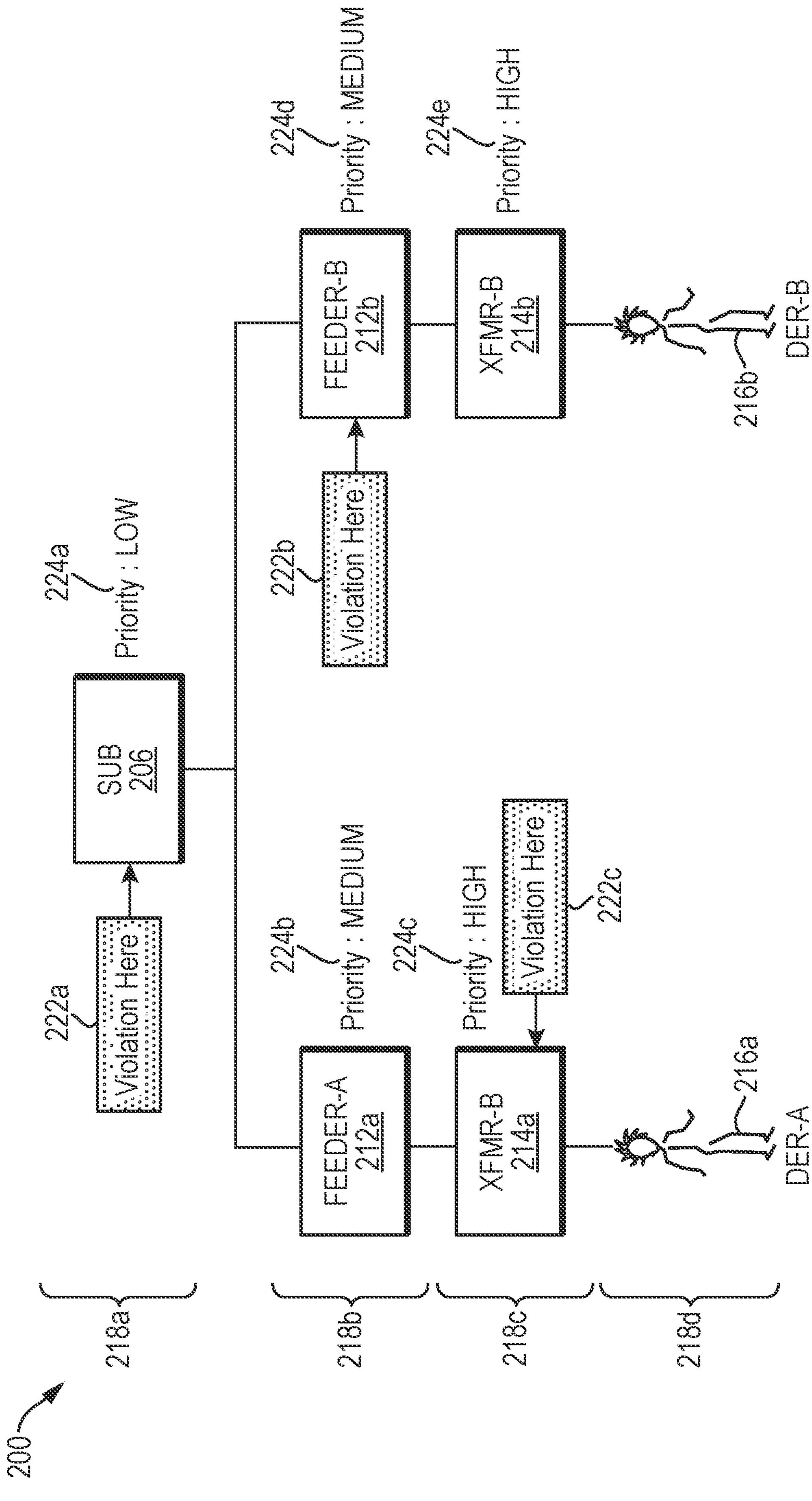
FIG. 2 is a block diagram of an example power grid environment and an embodiment controlling the same.

FIG. 2 provides a nonlimiting extended example of a subnetwork 200 with multiple violations 222*a-c*. The example subnetwork 200 includes four layers 218*a-d*. At the top layer 218*a* of the illustrated grid layers 218*a-d* is a substation (SUB) 206 where one violation 222*a* (e.g., a high load violation) may occur. SUB 206 may have nonlimiting example properties as given below ("HL"=high-level; "LL"=low-level) in Table 1:

TABLE 1

| SUB 206 Properties<br>SUB | |
|---|---|
| HL Threshold = | 1000 kW |
| LL Threshold = | −1000 kW |
| Actual = | 1500 kW |
| Control Error = | 500 kW |
| Gen Up Margin = | 0 kW |
| Gen Down Margin = | 0 kW |

In descending layer (grid topology) order, the layer 218*b* succeeding the SUB 206 layer (i.e., top layer 218*a*) includes feeders 212*a-b*. Another violation 222*b*, e.g., a low load violation, may occur at feeder 212*b*. The feeder 212*a* may have nonlimiting example properties as given below in Table 2:

TABLE 2

| Feeder 212a Properties<br>FEEDER-A | |
|---|---|
| HL Threshold = | 50 kW |
| LL Threshold = | −50 kW |
| Actual = | 10 kW |
| Control Error = | 0 kW |
| Gen Up Margin = | 0 kW |
| Gen Down Margin = | 0 kW |

Similarly, the feeder 212*b* may have nonlimiting example properties as given below in Table 3:

TABLE 3

| Feeder 212b Properties<br>FEEDER-B | |
|---|---|
| HL Threshold = | 50 kW |
| LL Threshold = | −50 kW |
| Actual = | −70 kW |
| Control Error = | −20 kW |
| Gen Up Margin | = 0 kW |
| Gen Down Margin = | 5 kW |

The grid layer 218*c* succeeding the feeders 212*a-b* layer (i.e., layer 218*b*) includes XFMRs 214*a-b* (e.g., service XFMRs). Another (third) violation 222*c*, e.g., a high load violation, may occur at XFMR 214*a*. XFMR 214*a* may have nonlimiting example properties as given below in Table 4:

TABLE 4

| XFMR 214a Properties<br>XFMR-A | |
|---|---|
| HL Threshold = | 10 kW |
| LL Threshold = | −10 kW |
| Actual = | 20 kW |
| Control Error = | 10 kW |
| Gen Up Margin = | 5 kW |
| Gen Down Margin = | 0 kW |

Similarly, XFMR 214*b* may have nonlimiting example properties as given below in Table 5:

TABLE 5

| XFMR 214b Properties<br>XFMR-B | |
|---|---|
| HL Threshold = | 10 kW |
| LL Threshold = | −10 kW |
| Actual = | 0 kW |

TABLE 5-continued

| XFMR 214b Properties<br>XFMR-B |
|---|
| Control Error = 0 kW |
| Gen Up Margin = 0 kW |
| Gen Down Margin = 5 kW |

At a terminal (lowest) level 218*d* of the grid topology 200 are DERs 216*a-b*. DER 216*a* may have nonlimiting example properties as given below in Table 6:

TABLE 6

| DER 216a Properties<br>DER-A |
|---|
| Power Limit = +/−5 kW |
| Output = 0 kW |
| Reg Up Limit = 5 kW |
| Reg Down Limit = 0 kW |

Similarly, DER 216*b* may have nonlimiting example properties as given below in
Table 7:

TABLE 7

| DER 216b Properties<br>DER-B |
|---|
| Power Limit = +/−5 kW |
| Output = 0 kW |
| Reg Up Limit = 0 kW |
| Reg Down Limit = −5 kW |

For the three illustrated example violations 222*a-c*, an energy resource control system (e.g., a RRDS) implementing an embodiment of the present disclosure may make nonlimiting example allocations as detailed below in Table 8. The active regpoints of Table 8 may be determined using the functionality described herein.

TABLE 8

Illustrative Power Allocations

| Resource | Active Regpoint | Nearest Regpoint | Grid State | Up-ward Margin | Down-ward Margin |
|---|---|---|---|---|---|
| DER-A | XFMR-A | XFMR-A | N/A | 5 | 0 |
| DER-B | FEEDER-B | XFMR-B | N/A | 0 | 5 |
| XFMR-A | N/A | FEEDER-A | HIGH LOAD VIOLATION | 5 | 0 |
| XFMR-B | FEEDER-B | FEEDER-B | RECURSIVE DISPATCH | 0 | 5 |
| FEEDER-A | SUB | SUB | RECURSIVE DISPATCH | 0 | 0 |
| FEEDER-B | N/A | SUB | LOW LOAD VIOLATION | 0 | 5 |
| SUB | N/A | N/A | HIGH LOAD VIOLATION | 0 | 0 |

With reference to the example properties (shown in Tables 1-7) and Table 8, a nonlimiting example detailed process of allocations may be as follows:

a) 0 kW of control error may be inherited by the feeder 212*a* regpoint from SUB 206 in, e.g., high load violation 222*a* of 500 kW (i.e., 1500 kW [actual]-1000 kW [HL threshold]=500 kW), leaving 500 kW of unallocated control error at SUB 206.

b) 0 kW of control error may be inherited by the feeder 212*b* regpoint from SUB 206, b) leaving 500 kW of unallocated control error at SUB 206.

c) 0 kW of control error may be inherited by XFMR 214*a* regpoint from feeder 212*a*.

d) 5 kW of control error may be inherited by XFMR 214*b* regpoint from feeder 212*b* in, e.g., low load violation 222*b* of −20 kW (i.e., −70 kW [actual]—−50 kW [LL threshold]=−20 kW), leaving −15 kW (of the initial −20 kW control error) of unallocated control error at the feeder 212*b*.

e) 5 kW of control error may be allocated to DER 216*a* from XFMR 214*a* in, e.g., high load violation 222*c* of 10 kW (i.e., 20 kW [actual]-10 kW [HL threshold]=10 kW); XFMR 214*a* may serve as the active regpoint for DER 216*a*, employing the functionality described herein.

f) 5*k* W of control error may be allocated to DER 216*b* from XFMR 214*b* (i.e., the same 5 kW inherited by XFMR 214*b* regpoint from feeder 212*b*); feeder 212*b* may serve as the active regpoint for DER 216*b*, employing the functionality described herein.

In some embodiments, one or more nodes may not be directly regulated by regpoints, but may nonetheless participate in regulation. For example, in an embodiment, a region in an electrical grid, e.g., region 102 in grid 100 (FIG. 1), may be a corresponding regpoint. However, according to one such embodiment, substations in the grid, e.g., substations 106*a-b* (FIG. 1), may not be regpoints. In an embodiment, control instructions may pass through a highest level node that can be directly regulated, e.g., region 102, and may pass through lower level nodes as well, even if a given lower level node has no regulatory requirement specified, e.g., substations 106*a-b*. According to one such embodiment, the highest level node, e.g., region 102, may be deemed a "master" point—with a corresponding highest priority—that ultimately controls any lower priority nodes below it, including, e.g., substations 106*a-b*. In another embodiment, there may be multiple master points, and a particular resource may be assigned to only one master point at any given time. According to one such embodiment, once a violation at one master point is resolved, a resource assigned to that master point may then be reassigned to a different master point. In certain embodiments, the reassignment may be performed automatically, based on the nonlimiting example criteria described hereinabove. For instance, according to an embodiment, after the master point is no longer in the power output deviation, the master point may be less preferred when the nonlimiting example criteria are applied. Moreover, in another embodiment, the master point selection process may occur continuously; thus, as configurations or properties of the grid, nodes, and/or resources change over time, this may cause a DER to be reassigned to assist in a "more important" (e.g., higher priority) power output deviation as defined by a selection system of embodiments.

Figure 3:
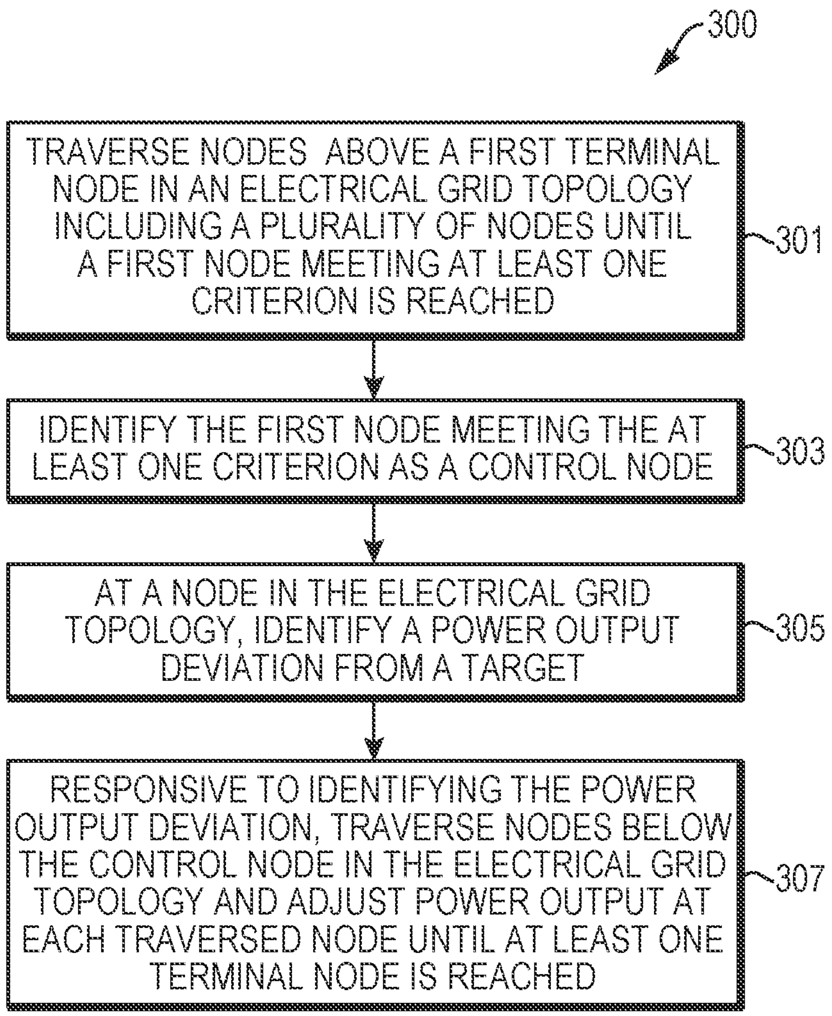
FIG. 3 is a flow diagram of a method for managing an electrical grid according to an embodiment.

FIG. 3 is a flowchart of an example method 300 for managing an electrical grid according to an embodiment. The method 300 is a computer-implemented method and, as such, the method 300 may be performed using any computing devices or combination of computing devices known to those of skill in the art, e.g., one or more digital processors.

At step 301, method 300 begins by traversing nodes above a first terminal node in an electrical grid topology including a plurality of nodes until a first node meeting at least one criterion is reached. In embodiments, the electrical grid topology may be a hierarchy or tree structure including multiple nodes, such as electrical grid topology 100 of FIG. 1 including nodes 102, 104*a-b*, 106*a-b*, 108*a-b*, 112*a-b*, 114*a-b*, and 116*a-f* or electrical grid topology 200 of FIG. 2 including nodes 206, 212*a-b*, 214*a-b*, and 216*a-b*. According to an embodiment, the first terminal node may be a DER, e.g., solar panel 116*a*, wind farm 116*b*, solar panel 116*c*, wind farm 116*d*, solar panel 116*e*, or wind farm 116*f* (FIG. 1) or DER 216*a* or DER 216*b* (FIG. 2). In an embodiment, the traversing is a bottom-up search where the method 300 examines each node (starting at a terminal node) until a node that meets the at least one criterion is reached. According to another embodiment, the first terminal node for a DER, e.g., 116*a-f* or 216*a-b*, may be the nearest node for that DER. Further, in another embodiment, where multiple DERs are in power output deviations, the method 300 may perform step 301 for the terminal node of one such DER, and, when the power output deviation for that DER is ultimately resolved, the method 300 may then repeat step 301 for the terminal node of another such DER with a power output deviation. In yet another embodiment where multiple DERs are in power output deviations, the method 300 may perform step 301 simultaneously for each DER in a power output deviation.

Continuing with FIG. 3, in an embodiment, at step 303 the method 300 identifies the first node meeting the at least one criterion as a control node. According to an embodiment, the at least one criterion includes the first node being a first regulation point and the first node being in a first power output deviation and an ancestor node of the first node being a second regulation point and the ancestor node not being in a second power output deviation. For instance, in another embodiment, with reference to FIG. 1, if the feeder 112*a* were in a power output deviation and no ancestor node of the feeder 112*a* (i.e., the substation XFMR 108, substation 106*a*, area 104*a*, and region 102) were in another power output deviation, then the feeder 112*a* would meet the criterion. Further, in yet another embodiment, the at least one criterion includes (i) the first node being a first regulation point and the first node being in a first power output deviation, e.g., node 212*b* with violation 222*b* (FIG. 2), and an ancestor node of the first node being a second regulation point and the ancestor node being in a second power output deviation, e.g., node 206 with violation 222*a* (FIG. 2), or (ii) the first node not being in the first power output deviation and the ancestor node not being in the second power output deviation, and a first user-defined priority of the first node, e.g., node 222*b* with medium priority 224*d* (FIG. 2), being greater than a second user-defined priority of the ancestor, e.g., node 206 with low priority 224*a* (FIG. 2). In another embodiment, the at least one criterion includes the first node being a first regulation point and the first node having an active status and an ancestor node of the first node being a second regulation point and the ancestor node having an inactive status. According to yet another embodiment, the at least one criterion includes the first node having at least one resource belonging to a UDG, an ancestor node of the first node being a regulation point, and at least one of: (i) the UDG being in a first power output deviation and the ancestor node not being in a second power output deviation, (ii) a first user-defined priority of the UDG being greater than a second user-defined priority of the ancestor node, or (iii) the UDG having an active status and the ancestor node having an inactive status.

Returning to FIG. 3, according to an embodiment, at step 305 the method 300, at a node in the electrical grid topology, identifies a power output deviation from a target. With reference to FIG. 1, the method 300 may, for example, determine at step 305 that a power imbalance in the electrical grid topology is occurring at substation 106*a*, due to too much power being generated under substation 106*a*. Similarly, referring to FIG. 2, the method 300 may, for example, determine that a power output violation, e.g., 222*a*, exists at substation 206. In another embodiment, the power output deviation from the target includes a power output violation or a deviation from a target value, e.g., a user-specified value or a target value determined by a control methodology.

Continuing still with FIG. 3, in an embodiment, at step 307 the method 300, responsive to identifying the power output deviation, traverses nodes below the control node in the electrical grid topology and adjusts power output at each traversed node until a terminal node is reached. According to an embodiment, adjusting power output includes, at a given traversed node, adjusting power output based on a resource of a node, e.g., DER 116*a-f* (FIG. 1) or 216*a-b* (FIG. 2), below the given traversed node in the electrical grid topology. In one such embodiment, the resource includes a power output increase margin or a power output decrease margin, e.g., a power output increase margin or a power output decrease margin as described hereinabove with respect to DERs 216*a-b* of FIG. 2. According to an embodiment, and with reference to FIG. 2, the method 300 may, at step 307, traverse the nodes below substation 206, i.e., feeders 212*a-b*, XFMRs 214*a-b*, DERs 216*a-b*, and make allocations as described in more detail above with respect to FIG. 2. In another embodiment, the method 300 further includes performing the traversing and the adjusting 307 until all terminal nodes are reached.

As noted, the method 300 of FIG. 3 is computer-implemented and, as such, the functionality and effective operations, e.g., the traversing (301 and 307), identifying (303 and 305), and adjusting (307), are automatically implemented by one or more digital processors. Moreover, the method 300 can be implemented using any computer device or combination of computing devices known in the art. Among other examples, the method 300 can be implemented using computer(s)/device(s) 50 and/or 60 described hereinbelow in relation to FIGS. 4 and 5 and interchangeably referenced as system 300.

Further, it is noted that an embodiment of the method 300 may not implement steps 301 and 303. Instead, such an embodiment of the method 300 starts at step 305 by identifying a power output deviation and, in turn, moves to step 307 where, responsive to identifying the deviation, nodes below a control node are traversed and power output at each traversed node is adjusted until at least one terminal node is reached.

Embodiments provide functionality to manage electrical grids. According an embodiment, an electrical grid is formed of nodes, where a node, e.g., in a topological group, may include a junction in the electrical grid, at which properties of a section of the grid can be measured. Nodes in the grid may be representative of varies objects, e.g., resources. According to another embodiment, a resource, e.g., a DER, may include a piece of physical or virtual electrical equipment that can receive and respond to control signals by decreasing or increasing its contribution to a grid. Further, in yet another embodiment, resources may have an associated margin where a resource's margin may include an amount that the resource can decrease or increase its contribution to a grid. Likewise, according to an embodiment, nodes may have a margin where a node's margin may include the sum of margins of all node(s) and/or resource(s) directly connected to that node. Embodiments may utilize control signals to implement changes/actions in the grid. In an embodiment, a control signal, e.g., for applying regulation, may include an instruction to decrease or increase contribution to a grid. Further, according to yet another embodiment, a control signal received by a resource may decrease or increase that resource's contribution to a grid. In an embodiment, a control signal received by a node may disseminate to node(s) and/or resource(s) directly connected to that node. According to another embodiment, embodiments may identify and limit violations in the grid. According to an embodiment, a violation may include an event that takes place upon a grid where a node measures an undesired quantity of some characteristic of the grid that responds to electrical contribution from resource(s). Further, in yet another embodiment, types of violations may include, but are not limited to, real power violations, reactive power violations, voltage violations, and frequency violations. According to an embodiment, a control node, which may be a type of master "regulation point" (regpoint), may include a node that has been selected, e.g., by a system of embodiments, a software system, or a controller, etc., to respond to a grid violation measured at the node itself. In another embodiment, a control node's response may be to adjust power output for resource(s) in the control node's section of a grid until either a violation is resolved or no resource has any further margin to contribute. Further, according to yet another embodiment, a control node may adjust power output by sending control signals to any directly connected intermediate node(s) and/or resource(s). In an embodiment, an intermediate node, which may be a regpoint, may include any node through which control signal(s) disseminate on their way to resource(s). According to another embodiment, a terminal node may include any node that does not have further node(s) connected to it; however, it is noted that terminal nodes may not necessarily be the only nodes that have resources connected to them. Further, in yet another embodiment, a UDG may include a collection of resources selected by an end user. It is noted that UDGs including collections of nodes are also contemplated by embodiments. According to an embodiment, a UDG may serve as a control node, but not as an intermediate node.

Figure 4:
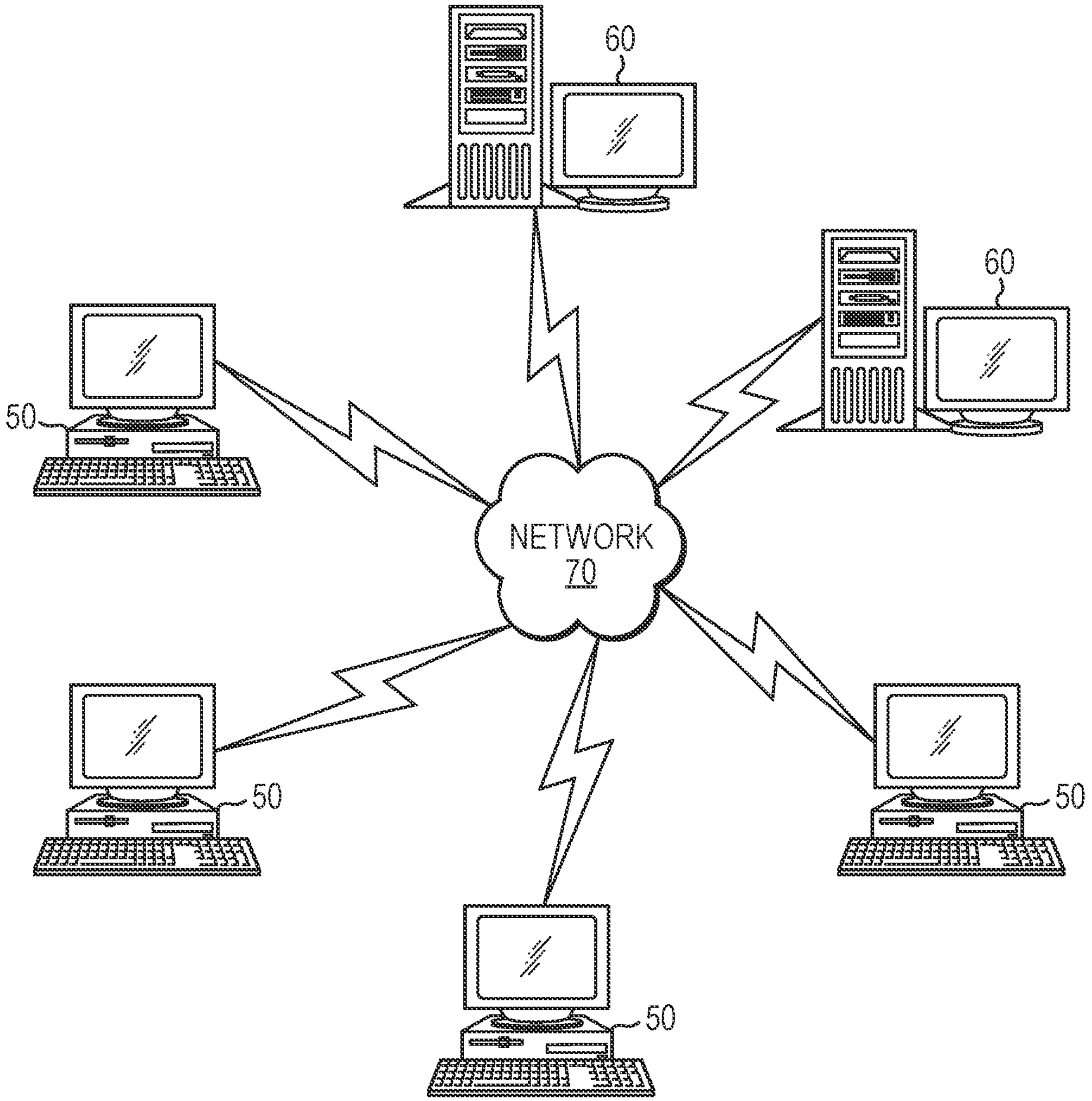
FIG. 4 is a schematic view of a computer network in which embodiments may be implemented.

FIG. 4 is a schematic view of a computer network environment in which embodiments may be implemented.

Client computer(s)/devices 50 and server computer(s) 60 provide processing, storage, and input/output (I/O) devices executing application programs and the like. Client computer(s)/device(s) 50 can also be linked through communications network 70 to other computing devices, including other client device(s)/processor(s) 50 and server computer(s) 60. Communications network 70 can be part of a remote access network, a global network (e.g., the Internet), cloud computing servers or service, a worldwide collection of computers, local area or wide area networks, and gateways that currently use respective protocols (TCP/IP (Transmission Control Protocol/Internet Protocol), Bluetooth®, etc.) to communicate with one another. Other electronic device/computer network architectures are suitable.

Figure 5:
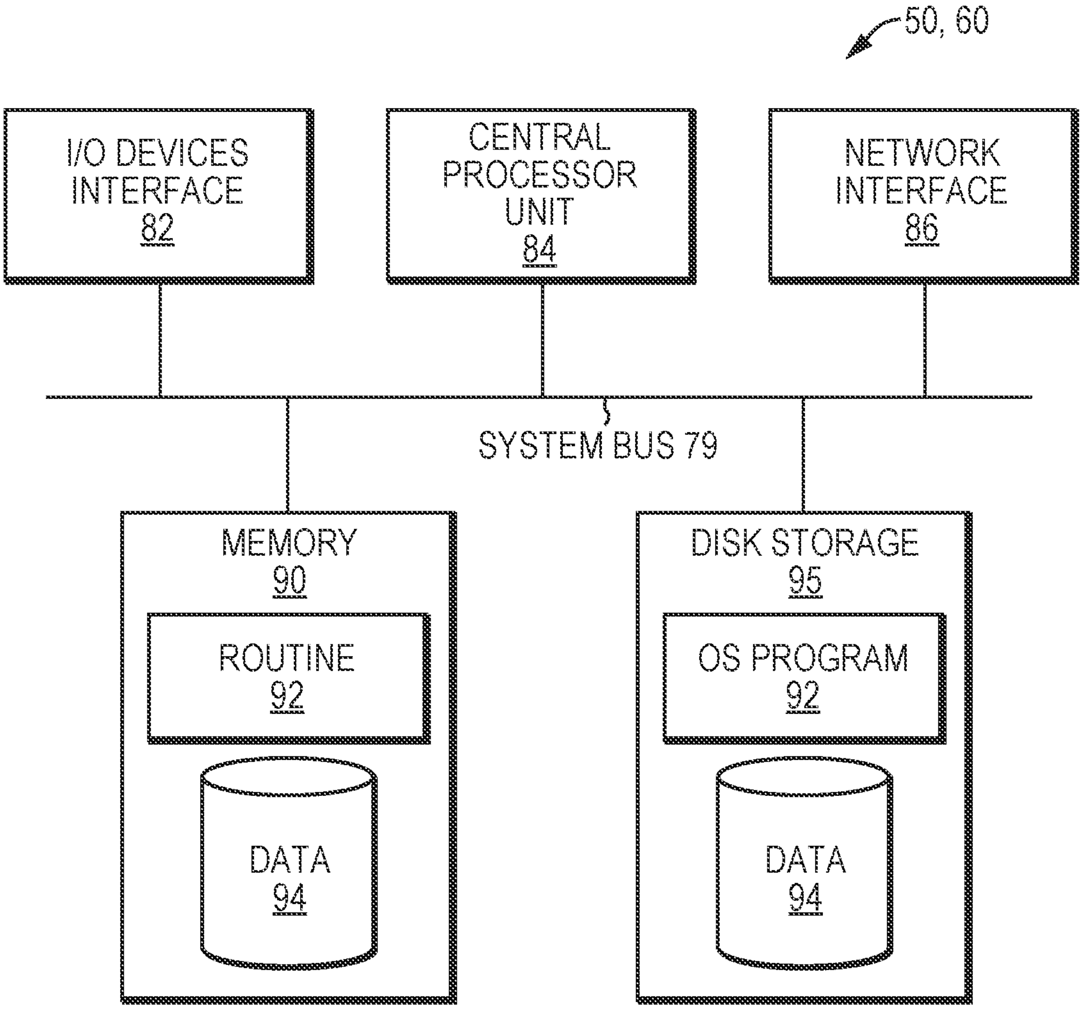
FIG. 5 is a block diagram illustrating an example embodiment of a computer node in the computer network of FIG. 4.

FIG. 5 is a block diagram illustrating an example embodiment of a computer node (e.g., client processor(s)/device(s) 50 or server computer(s) 60) in the computer network of FIG. 4. Each computer node 50, 60 contains system bus 79, where a bus is a set of hardware lines used for data transfer among components of a computer or processing system. Bus 79 is essentially a shared conduit that connects different elements of a computer system (e.g., processor, disk storage, memory, I/O ports, network ports, etc.) that enables transfer of information between the elements. Attached to system bus 79 is I/O device interface 82 for connecting various input and output devices (e.g., keyboard, mouse, display(s), printer(s), speaker(s), etc.) to the computer node 50, 60. Network interface 86 allows the computer node to connect to various other devices attached to a network (e.g., network 70 of FIG. 4). Memory 90 provides volatile storage for computer software instructions 92 and data 94 used to implement an embodiment of the present disclosure (e.g., method 300 described hereinabove with respect to FIG. 3). Disk storage 95 provides non-volatile storage for computer software instructions 92 and data 94 used to implement an embodiment of the present disclosure. Central processor unit 84 is also attached to system bus 79 and provides for execution of computer instructions.

In one embodiment, the processor routines 92 and data 94 are a computer program product (generally referenced as 92), including a computer readable medium (e.g., a removable storage medium such as DVD-ROM(s), CD-ROM(s), diskette(s), tape(s), etc.) that provides at least a portion of the software instructions for the disclosure system. Computer program product 92 can be installed by any suitable software installation procedure, as is well known in the art. In another embodiment, at least a portion of the software instructions may also be downloaded over a cable, communication, and/or wireless connection. In other embodiments, the disclosure programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present disclosure routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network (such as network 70 of FIG. 4). In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for managing an electrical grid, the computer-implemented method comprising:

identifying a control node in an electrical grid topology including a plurality of nodes, the identifying comprising:

traversing nodes above a first terminal node in the electrical grid topology until a first node meeting at least one criterion is reached; and identifying the first node meeting the at least one criterion as the control node;

at a node in the electrical grid topology identifying a power output deviation from a target; and responsive to identifying the power output deviation, traversing nodes below the control node in the electrical grid topology and adjusting power output at each traversed node until at least one terminal node is reached.

2. The computer-implemented method of claim 1, further comprising:

performing the traversing and the adjusting until all terminal nodes are reached.

3. The computer-implemented method of claim 1, wherein the power output deviation from the target includes at least one of: (i) a power output violation and (ii) a deviation from a user-specified value.

4. The computer-implemented method of claim 1, wherein the at least one criterion includes the first node being a first regulation point and the first node being in a first power output deviation and an ancestor node of the first node being a second regulation point and the ancestor node not being in a second power output deviation.

5. The computer-implemented method of claim 1, wherein the at least one criterion includes (i) the first node being a first regulation point and the first node being in a first power output deviation and an ancestor node of the first node being a second regulation point and the ancestor node being in a second power output deviation or (ii) the first node not being in the first power output deviation and the ancestor node not being in the second power output deviation, and a first user-defined priority of the first node being greater than a second user-defined priority of the ancestor node.

6. The computer-implemented method of claim 1, wherein the at least one criterion includes the first node being a first regulation point and the first node having an active status and an ancestor node of the first node being a second regulation point and the ancestor node having an inactive status.

7. The computer-implemented method of claim 1, wherein the at least one criterion includes the first node having at least one resource belonging to a user-defined group (UDG), an ancestor node of the first node being a regulation point, and at least one of: (i) the UDG being in a first power output deviation and the ancestor node not being in a second power output deviation, (ii) a first user-defined priority of the UDG being greater than a second user-defined priority of the ancestor node, and (iii) the UDG having an active status and the ancestor node having an inactive status.

8. The computer-implemented method of claim 1, wherein the node is the control node.

9. The computer-implemented method of claim 1, wherein adjusting power output includes:

at a given traversed node, adjusting power output based on at least one resource of at least one node below the given traversed node in the electrical grid topology.

10. The computer-implemented method of claim 9, wherein adjusting power output based on the at least one resource includes adjusting power output based on at least one of: a power output increase margin of the at least one resource and a power output decrease margin of the at least one resource.

11. A computer-based system for managing an electrical grid, the computer-based system comprising:

a processor; and a memory with computer code instructions stored thereon, the processor and the memory, with the computer code instructions, being configured to cause the computer-based system to:

identify a control node in an electrical grid topology including a plurality of nodes, the identifying comprising:

traversing nodes above a first terminal node in the electrical grid topology until a first node meeting at least one criterion is reached; and identifying the first node meeting the at least one criterion as the control node;

at a node in the electrical grid topology, identify a power output deviation from a target; and responsive to identifying the power output deviation, traverse nodes below the control node in the electrical grid topology and adjust power output at each traversed node until at least one terminal node is reached.

12. The computer-based system of claim 11, wherein the at least one criterion includes the first node being a first regulation point and the first node being in a first power output deviation and an ancestor node of the first node being a second regulation point and the ancestor node not being in a second power output deviation.

13. The computer-based system of claim 11, wherein the at least one criterion includes (i) the first node being a first regulation point and the first node being in a first power output deviation and an ancestor node of the first node being a second regulation point and the ancestor node being in a second power output deviation or (ii) the first node not being in the first power output deviation and the ancestor node not being in the second power output deviation, and a first user-defined priority of the first node being greater than a second user-defined priority of the ancestor node.

14. The computer-based system of claim 11, wherein the at least one criterion includes the first node being a first regulation point and the first node having an active status and an ancestor node of the first node being a second regulation point and the ancestor node having an inactive status.

15. The computer-based system of claim 11, wherein the at least one criterion includes the first node having at least one resource belonging to a user-defined group (UDG), an ancestor node of the first node being a regulation point, and at least one of: (i) the UDG being in a first power output deviation and the ancestor node not being in a second power output deviation, (ii) a first user-defined priority of the UDG being greater than a second user-defined priority of the ancestor node, and (iii) the UDG having an active status and the ancestor node having an inactive status.

16. A computer program product for managing an electrical grid, the computer program product comprising a non-transitory computer-readable medium with computer code instructions stored thereon, the computer code instructions being configured, when executed by a processor, to cause an apparatus associated with the processor to:

identify a control node in an electrical grid topology including a plurality of nodes, the identifying comprising:

traversing nodes above a first terminal node in the electrical grid topology until a first node meeting at least one criterion is reached; and identifying the first node meeting the at least one criterion as the control node;

at a node in the electrical grid topology, identify a power output deviation from a target; and responsive to identifying the power output deviation, traverse nodes below the control node in the electrical grid topology and adjust power output at each traversed node until at least one terminal node is reached.

* * * * *